United States Patent Office 2,824,139
Patented Feb. 18, 1958

2,824,139

FLUOROCHLORO KETONES AND METHODS FOR THE PREPARATION THEREOF

William S. Barnhart, Cranford, and Joseph L. Zollinger, Bloomfield, N. J., assignors, by mesne assignments, to Minnesota Mining and Manufacturing Company, St. Paul, Minn., a corporation of Delaware No Drawing. Application June 24, 1955
Serial No. 517,927

14 Claims. (Cl. 260—592)

This invention relates to novel ketone derivatives of perchlorofluorocarboxylic acids.

The novel ketone derivatives of this invention may be prepared in a variety of ways. For example, they may be prepared by (1) the interaction between a perchlorofluorocarboxylic acid halide and an organometallic compound, such as an alkyl, aryl, alkenyl, cycloalkyl, cycloalkenyl, or heterocyclic cadmium, zinc, aluminum, lead, silver, copper, or bismuth compound. The ketones may also be prepared by the reaction of a perchlorofluorocarboxylic acid halide with an aromatic compound in the presence of a catalyst or (2) by the interaction of a perchlorofluoronitrile with a Grignard reagent having the formula RMgX in which R is alkyl or aryl and X is halogen, or (3) by the interaction of an ester of a perchlorofluorocarboxylic acid and an active hydrogen-containing compound in the presence of an alkaline reagent, or (4) by the interaction of a perchlorofluorocarboxylic acid anhydride and an aromatic compound in the presence of a catalyst or (5) by the addition of aldehydes to perchlorofluoroolefins or (6) by the oxidation of polychlorofluoro secondary alcohols.

In the first of the methods above listed, a perchlorofluorocarboxylic acid halide, which may be prepared according to the disclosure of copending application Serial No. 499,250, filed April 4, 1955, is reacted with an aromatic compound to form aromatic ketones or polyketones in the presence of a Lewis acid catalyst, such as $AlCl_3$, $AlBr_3$, $ZnCl_2$, $SnCl_4$, and $BF_3$, and of these, $AlCl_3$ is preferred. The reaction is performed in the presence of a solvent for the acid halide and/or the aromatic compound, the solvent serving to suspend the catalyst in the mixture and to promote better mixing of the reactants. If the aromatic compound is a solid, it is invariably dissolved in the solvent, while a solution of the acid chloride may be used, if desired. Suitable solvents which may be used in this reaction are nitrobenzene, carbon disulfide, petroleum ether, tetrachloroethylene, methylene or ethylene chloride, and the like, or an excess of the aromatic reactants, for example, benzene.

Generally speaking, this method of ketone preparation is performed by gradually adding the perchlorofluorocarboxylic acid halide, preferably the chloride, to the aromatic compound with agitation using a molar ratio of acid chloride to aromatic compound of about 1:1 to about 1:20, preferably about 1:1 to about 1:10, based upon the use of a monoacid chloride. The reaction occurs at temperatures in the range of about —10 to 100° C., preferably between 0° C. and about 50° C., the reaction time being between about 0.5 hour and about 48 hours, preferably between about 1 hour and about 16 hours. The reaction mixture is decomposed by the addition of dilute mineral acid and ice, after which the organic layer is separated, washed several times with a dilute hydrogen chloride solution to remove the metal ion of the catalyst and is then washed with water, dried, and distilled if the product is a liquid or recrystallized if the product is a solid. It is sometimes advantageous to remove the solvent, such as benzene or nitrobenzene, and the like, by steam distillation in order to avoid the formation of an emulsion during the isolation procedure and to replace the initial solvent with another solvent such as ether which aids in the isolation of the product and which is easily evaporated.

Method No. 4 above, i. e., the reaction of a perchlorofluorocarboxylic acid anhydride with an aromatic compound, is performed in the same manner and under the same conditions as those described for the reaction of a perchlorofluorocarboxylic acid halide with an aromatic compound, except that where the acid halide is used, the molar ratio of acid halide to catalyst is between about 1:3 and about 1:1, preferably about 1:1.2, whereas when the acid anhydride is used, the molar ratio of anhydride to catalyst is between about 1:5 and about 1:1.5, preferably about 1:2.2.

In method 1 above, in which the ketones are prepared by reacting a perchlorofluorocarboxylic acid halide with an organometallic compound, the organometallic compound, such as an alkyl or aryl cadmium reagent, is obtained by preparing a Grignard reagent in ether solution, adding an anhydrous cadmium halide while stirring, and refluxing the mixture. Suitable cadmium compounds are formed from Grignard reagents such as $CH_3MgI$, $C_2H_5MgI$, $C_3H_7MgBr$, $C_4H_9MgBr$, $(CH_3)_2CHMgBr$, $C_6H_5MgBr$, $C_6H_5CH_2MgCl$, and the like. Where higher reaction temperatures are required, the ether solvent may be replaced by a higher boiling solvent, such as benzene, cyclohexane, toluene, xylene, and the like, benzene being preferred.

Generally speaking, in this method of preparation the acid halide or a solution of the acid halide is gradually added to a cold agitated mixture of the alkyl or aryl cadmium reagent. After the addition, stirring is continued at a temperature in the range of about —20 to about +175° C., preferably at about the boiling temperature of the solvent, i. e., 30 to 140° C., during a period between about 0.5 hour and about 8 hours, preferably between about 1 hour and about 4 hours. The molar ratio of monoacid halide to alkyl or aryl cadmium compound is between about 3:1 and about 1:10, preferably between about 2:1 and about 1:2. If a polyacid halide is used, the ratio is correspondingly increased in favor of the cadmium compound. The reaction mixture is decomposed with ice and water, and the organic phase is separated, washed with sodium bicarbonate and then with water until the washings are neutral, and is then dried and distilled if the product is a liquid or is recrystallized if the product is a solid.

In method 2 above, i. e., the reaction of perchlorofluoronitriles, which may be prepared according to the disclosure of copending application Serial No. 509,408, filed May 18, 1955, now Patent No. 2,788,362, with a freshly prepared Grignard reagent, the reaction is accomplished by adding, with agitation, the nitrile or an ether solution of the nitrile to an ether solution of the Grignard reagent using a molar ratio of mononitrile to Grignard reagent in the range of between about 1:10 to about 1:1; preferably between about 1:3 and about 1:1, under anhydrous conditions. Where dinitriles are used, the ratio is correspondingly increased in favor of the Grignard reagent. The Grignard reagents which may be used are those previously disclosed as efficacious for the formation of alkyl or aryl cadmium reagents.

Generally speaking, the reaction should be performed in the absence of air, i. e., a nitrogen atmosphere may be used, at a temperature in the range of between about —10 to about +100° C., preferably between about 0° C. to about 50° C., for a period not exceeding about 16 hours, although usually not more than 6 hours will be required, as the product begins to form immediately. The reaction mixture may be decomposed with water and a dilute mineral acid such as hydrogen chloride, or ammonium chloride may be used. The organic layer is then separated, washed with water until neutral, and dried, and if the product is a liquid, it is distilled, and if it is a solid, it is recrystallized.

In method 3 above, i. e., the reaction of an ester of a perchlorofluorocarboxylic acid, which may be prepared according to the disclosure of copending application Serial No. 493,554, filed March 10, 1955, and an active hydrogen-containing compound, an alkyl, aryl, alkenyl, cycloalkyl, cycloalkenyl, or heterocyclic compound containing an active hydrogen atom is acylated in the presence of an alkaline reagent, such as sodium methoxide, sodium hydride, sodium t-butoxide, sodium ethoxide, and the like, and of these, sodium methoxide is preferred. Suitable compounds containing an active hydrogen atom are ketones, such as butyrophenone, propiophenone, and the like, nitriles such as acetonitrile, propionitrile, and the like, and esters and the like. The molar ratio of monoester to the active hydrogen-containing compound is between about 1:10 and about 10:1, preferably between about 1:2 and about 2:1, with equimolar quantities being most preferred. Where polyesters are used, the ratio is correspondingly increased in favor of the active hydrogen-containing compound. The molar ratio of ester or active hydrogen-containing compound to alkaline reagent is about 1:2. The temperature of the reaction may be between about −20° C. and about +150° C., preferably between about 0° C. and about 100° C., and the reaction time is between about 15 minutes and about 48 hours, the reaction usually being completed within about 24 hours.

Generally speaking, the alkaline reagent is suspended in a suitable solvent, such as butyl, ethyl, or propyl ether or benzene, toluene, and the like, and the perchlorofluoroester, dissolved in the solvent, is added gradually to the suspended alkaline reagent. The active hydrogen-containing compound, which may or may not be dissolved in a solvent, is introduced very slowly into the mixture. The order of addition may be reversed, if desired, i. e., the ketone may be added to the alkaline reagent and the ester may subsequently be added to the mixture. All of the additions are performed while agitating the mixture. After the reaction has been completed, the solvent may be removed and replaced with another solvent, for example, toluene, benzene, and the like, if desired. A dilute acid or weak acid and water may then be added to the solution, the organic phase separated, the aqueous phase extracted, and the combined organic layers washed until neutral. The organic phase is then dried and distilled to obtain the desired polychlorofluoroketone.

Method 5 above, i. e., the addition reaction of an aldehyde to a terminally unsaturated perchlorofluoroolefin containing from 4 to 20 carbon atoms, prepared according to the method disclosed in copending application Serial No. 517,926, filed June 24, 1955, is effected in the presence of an organic peroxide catalyst. Suitable catalysts are organic peroxides, such as benzoyl and acetyl peroxides, t-butyl perbenzoates, and t-butyl hydroperoxide, and of these benzoyl peroxide is preferred. The catalyst represents between about 0.05 percent to about 5 percent, preferably from about 0.25 percent to about 2 percent by weight of the reactants. The molar ratio of monoaldehyde to monoolefin is between about 10:1 and about 1:2, preferably between about 2:1 and about 1:1. The reaction temperature may be between about 50° C. and about 250° C., preferably between about 70° C. and about 150° C., for a period of from 1 to 48 hours but usually not more than 24 hours. The reaction may be performed in an open vessel or in a bomb with agitation, and after the reaction has run to completion, the crude ketone is purified by fractionation.

In method 6 above a secondary polychlorofluoroalcohol, prepared according to the disclosure of copending application Serial No. 517,928, filed June 24, 1955, is oxidized to produce a ketone using a strong oxidizing agent, such as potassium dichromate, nitric acid, chromic anhydride, potassium permanganate or aluminum t-butoxide together with a hydrogen acceptor such as acetone, and the like. In this reaction, a small amount of an acid may also be used with the inorganic oxidizing agents provided that an acid is not used as the oxidizing agent. Sulfuric acid is preferred for this purpose; however, acetic acid may also be used. The reaction temperature may be between about 50° C. and about 200° C., preferably from 70° C. to 150° C., and the time of reaction may be between about 1 and about 48 hours and is usually not more than 24 hours. The molar ratio of secondary polychlorofluoromonoalcohol to oxidizing agent is between about 1:1 and about 1:5, preferably between about 1:1 and about 1:2.

The preferred monoketones produced by the methods of this invention have the formula

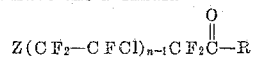

in which Z is chlorine or a perhalomethyl radical having a total atomic weight not in excess of 146.5, Z preferably being chlorine, $n$ is an integer from 2 to 10 and R is a substituted or unsubstituted alkyl, aryl, alkenyl, cycloalkyl, cycloalkenyl, or heterocyclic radical having not in excess of about 20 carbon atoms.

The preferred diketones produced by the methods of this invention have the formula

in which $n$ is an integer from 2 to 8 and R is a substituted or unsubstituted alkyl, aryl, alkenyl, cycloalkyl, cycloalkenyl, or heterocyclic radical having not in excess of about 20 carbon atoms.

Exemplary of the unsubstituted alkyl radicals which may be used in the above formulas are methyl, ethyl, propyl, butyl, and the like and isomers thereof, while substituted alkyl radicals may be 2-ethoxyethyl, 2-methoxyethyl, and the like and isomers thereof; unsubstituted aryl radicals may be phenyl xylyl, ethylphenyl, cymyl, duryl, cumyl, naphthyl, methylnaphthyl, benzyl, and the like and isomers thereof, while substituted aryl radicals may be anisyl, dimethoxyphenylene, chlorophenyl, chloroxylyl, dichlorophenylene, chloroanisyl, chloronaphthyl, dimethylaminophenyl, vinylphenyl, cresyl, hydroxyphenyl, aminophenyl, and the like and isomers thereof; unsubstituted alkenyl radicals may be allyl, butenyl, pentenyl, and the like and isomers thereof, while substituted alkenyl radicals may be 2-ethoxyallyl and the like; unsubstituted cycloalkyl radicals may be cyclohexyl, cyclopentyl, cyclobutyl, bornyl, methylcyclohexyl, camphanyl, and the like and isomers thereof, while substituted cycloalkyl radicals may be methoxycyclohexyl, dimethylaminocyclohexyl, and the like and isomers thereof; unsubstituted cycloalkenyl radicals may be cyclohexenyl, cyclopentenyl, methylcyclohexenyl, and the like and isomers thereof, while substituted cycloalkenyl radicals may be methoxycyclohexenyl, and the like and isomers thereof; and unsubstituted heterocyclic radicals may be pyranyl, furyl, pyrryl, thienyl, pyridyl, pyrazinyl, and the like and isomers thereof, while substituted heterocyclic radicals may be chlorofuryl, chloropyrryl, chlorothienyl, dichloropyrryl, methoxypyridyl, and the like and isomers thereof.

The novel polychlorofluoroketones of this invention have utility as plasticizers for polychlorotrifluoroethylene plastic and are used, for example, in a quantity of about 5 to 30 parts per 100 parts of plastic. They are also useful as surfactants, intermediates, and the like.

The invention will be further illustrated by reference to the following specific examples:

EXAMPLE 1

*Preparation of* Cl(CF$_2$CFCl)$_3$CF$_2$COC$_6$H$_5$

*Experiment 1.*—Cl(CF$_2$CFCl)$_3$CF$_2$COCl (0.3 mole) was added dropwise to a stirred mixture of 0.33 mole of anhydrous AlCl₃ (powdered) and 1.0 mole of dry benzene maintained at 3 to 7° C. The mixture was stirred overnight while it gradually warmed to room temperature. The brown-black solution was cooled and poured into 200 ml. of 6 N HCl. After mixing, the organic layer was washed with 5 percent sodium bicarbonate solution. An emulsion formed which could not be resolved except by removal of the excess benzene by steam distillation. The aqueous layer was decanted and the dark brown organic layer was dissolved in ether, treated with calcium chloride, evaporated and distilled through a short Vigreux column at reduced pressure. The yield of slightly cloudy, colorless liquid boiling at 148 to 149° C./1.3 mm. was 0.127 mole (42.5 percent). $n_D^{20}=1.4534$. $d_4^{20}=1.732$. Molar refractivity calc.: 83.6. Found: 84.4. Infra-red analysis indicates a carbonyl group. Calc. $C_{14}H_5OCl_4F_{11}$: Cl, 26.25. Found: Cl, 26.33.

This aromatic ketone can be reduced and sulfonated to give a surface active agent.

*Experiment 2.*—To a stirred, cold mixture of 113 grams (0.85 mole) of AlCl₃ in 500 ml. of dry benzene were added, over a 15 minute period, 384 grams (206 ml.; 0.77 mole) of $Cl(CF_2CFCl)_3CF_2COCl$. The mixture was stirred for 5 hours while allowing it to warm to room temperature. During the first two hours, the mixture darkened while becoming homogeneous (the reaction is exothermic and the temperature rises to about 40° C.). The solution was decomposed with about a 1 liter mixture of water and ice to which 100 ml. of 6 N HCl had been added. The organic phase was washed several times with 3 percent HCl and then with water. Most of the benzene was removed on a steam bath using a nitrogen stream. To the cooled residue was added about 0.5 liter of ether and the resulting solution was washed three times with 5 percent sodium bicarbonate, twice with water and once with a saturated sodium chloride solution. The solvent was evaporated and the residue was fractionated through a 6 inch Vigreux column to give, after a 9 gram forerun, 303 grams (0.565 mole; 73.5 percent) of pale yellow liquid, B. P. 138 to 144° C./1 to 1.5 mm., $d_4^{20}=1.725$, $n_D^{20}=1.4555$ (a 36 gram tarry residue remained).

EXAMPLE 2

*Preparation of $Cl(CF_2CFCl)_3CF_2COC_4H_9$*

To a dry nitrogen flushed flask containing 0.42 mole of magnesium turnings and 50 ml. of dry ether was added slowly with stirring 0.42 mole of n-butyl bromide in 150 ml. of dry ether. After the exothermic reaction had subsided, the mixture was refluxed for 0.5 hour. Anhydrous cadmium chloride (0.23 mole) was added to the cooled, stirred solution and the mixture was allowed to stand overnight under nitrogen. After refluxing for 1 hour, $Cl(CF_2CFCl)_3CF_2COCl$ (0.40 mole) in 150 ml. of ether was added with stirring to the cooled mixture. The resulting pasty mixture was diluted with ether and refluxed with stirring for 1.5 hours. The mixture was cooled and poured into 250 grams of ice and water. The resulting acidic mixture was separated and the organic phase was washed with sodium bicarbonate (5 percent aq) and then with a saturated sodium chloride solution until neutral. After treating with anhydrous calcium sulfate, the ether solution was evaporated and the residue was distilled at reduced pressure. The results of this distillation are as follows:

| Fraction | Weight (grams) | B. P. (0° C.) | P. (mm.) | $n_D^{20}$ | $d_4^{20}$ |
|---|---|---|---|---|---|
| 1 | 2.6 | 126–129 | 2.3 | 1.4021 | 1.637 |
| 2 | 8.1 | 129–131 | 2.5 | 1.4027 | 1.636 |
| 3 | 15.5 | 131–132 | 2.6 | 1.4029 | 1.636 |
| 4 | 4.9 | 132–171 | 2.6–0.08 | 1.4060 | 1.712 |
| 5 | 10.2 | 171–176 | 0.08 | 1.4075 | 1.796 |
| 6 | 12.8 | 176–178 | 0.09 | 1.4078 | 1.791 |
| 7 | 10.3 | 178–189 | 0.09–0.5 | 1.4082 | 1.785 |
| 8 | 3.2 | 189+ | 0.5 | 1.4084 | |
| 9 | 3.5 | Residue | | | |

The molar refractivity for $Cl(CF_2CFCl)_3CF_2COC_4H_9$ is calculated to be 77.8. Fraction 2 gives a value of 77.5. Analysis of fraction 2: Calc. for $C_{12}H_9OCl_4F_{11}$: Cl, 27.2. Found: Cl, 27.1. Semicarbazone analysis: Calc. for $C_{13}H_{12}ON_3Cl_4F_{11}$: N, 7.3. Found: N, 7.4, 7.22.

EXAMPLE 3

*Proposed structure of high boiling product obtained in the preparation of $Cl(CF_2CFCl)_3CF_2COC_4H_9$ (Example 2)*

In the preparation of $Cl(CF_2CFCl)_3CF_2COC_4H_9$, a high boiling fraction was obtained as the main product. Infra-red analysis revealed a strong carbonyl absorption and the absence of —OH or olefinic absorption. It is proposed that a diketone having structure I is formed in the reaction.

I 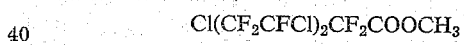

A table comparing observed properties of fraction 6 obtained in the butyl ketone preparation of Example 2 and calculated values for the proposed product is given below:

| | M. W. | Percent C | Percent H | Percent Cl | MR$_D$ | I. R. |
|---|---|---|---|---|---|---|
| Diketone (I) (Calcd.) | 982 | 24.46 | 0.82 | 28.82 | 135.0 | >C=O |
| Fraction 6 (Found) | 942 | 24.23 | 0.97 | 28.75 | 134.8 | >C=O |

EXAMPLE 4

*Preparation of propyl-2,4,5-trichlorooctafluoropentyl ketone*

To a stirred suspension of 0.6 mole of sodium methoxide in 200 ml. of absolute ether, is slowly added, over a period of 0.5 hour, 0.3 mole of $$Cl(CF_2CFCl)_2CF_2COOCH_3$$

in 200 ml. of anhydrous ether. Then, 0.3 mole of butyrophenone in 50 ml. of anhydrous ether is added, over a period of one hour, to the mixture which is stirred for a period of two days. After the reaction is complete, the ether is removed by evaporation. To the residue, 100 ml. of toluene, 50 ml. of glacial acetic acid and sufficient water to dissolve the sodium acetate formed, are added successively. The aqueous phase is extracted with toluene and the combined organic phases are washed with cold saturated sodium bicarbonate and then with water until neutral. The organic phase is dried over anhydrous calcium sulfate and distilled to give propyl-3,5,6-trichlorooctafluoropentyl ketone in about 35 percent yield.

EXAMPLE 5

*Preparation of $Cl(CF_2CFCl)_2CF_2CHFCF_2COCH_3$*

To an autoclave is charged 0.5 mole of 4,6,7-trichloroundecafluoroheptene-1, 0.5 mole of acetaldehyde and 0.5 gram of benzoyl peroxide. The contents of the autoclave are shaken for 20 hours at 80° C. Fractionation of the reaction mixture produces a yield of about 50 percent of the desired ketone $$(Cl(CF_2CFCl)_2CF_2CHFCF_2COCH_3)$$

EXAMPLE 6

*Preparation of ethyl-2,4,6,7-tetrachloroundecafluoroheptyl ketone*

A Grignard reagent is prepared from 0.2 mole of magnesium turnings in 500 ml. of anhydrous ether and 0.2 mole of freshly distilled ethyl bromide and added to a flask equipped with a stirrer, a reflux condenser and a dropping funnel.

3,5,7,8-tetrafluoroundecafluorooctanonitrile (0.2 mole) is added, over a 2 hour period, to the chilled Grignard solution and stirred for 3 hours at room temperature. Hydrolysis is effected by the dropwise addition of 300 ml. of 20 percent aqueous $H_2SO_4$. The ether layer is separated, dried and distilled and the residual liquid is redistilled. The product, ethyl-2,4,6,7-tetrachloroundecafluoroheptyl ketone is obtained in about 55 percent yield.

EXAMPLE 7

*Preparation of methyl-2-hydro-4,5-dichlorooctafluoropentyl ketone*

Methyl-2-hydro-4,5-dichlorooctafluoropentyl carbinol (0.3 mole) and 100 ml. of glacial acetic acid are poured into a 500 ml., 3-necked flask, and a mixture of 75 grams of sodium dichromate, 100 ml. of water and 75 grams of $H_2SO_4$ is added dropwise with stirring over a period of 3 hours. The reaction mixture is extracted with benzene, dried over anhydrous calcium sulfate, and fractionated to give methyl-2-hydro-4,5-dichlorooctafluoropentyl ketone in about 60 percent yield.

EXAMPLE 8

*Preparation of 3,5,7,8-tetrachloroundecafluorooctanoic anhydride*

To 2 moles of 3,5,7,8-tetrachloroundecafluorooctanoic acid is added 1 mole of $SO_3$. The mixture is heated on a steam bath under reflux conditions for 5 hours. The sulfuric acid layer is extracted with chloroform and the combined organic phases are distilled. The fraction distilling up to the B. P. of acid is collected and yields about 75 percent of the desired anhydride.

EXAMPLE 9

*Preparation of* $Cl(CF_2CFCl)_3CF_2COC_6H_5$

To a stirred, cold mixture of $AlCl_3$ (1.1 mole) in 250 ml. (5 moles) of dry benzene is added, over a period of 15 minutes, 0.5 mole of 3,5,7,8-tetrachloroundecafluorooctanoic anhydride. The mixture is stirred for 5 hours and allowed to come to room temperature. During the first two hours the mixture darkens. The solution is decomposed with about 1 liter of a mixture of water and ice to which 100 ml. of 6 N HCl has been added. The organic phase is washed several times until the washings are neutral. Most of the benzene is removed on a steam bath using a nitrogen stream. To the cooled residue is added about 0.25 liter of ether and the resulting solution is washed several times with sodium bicarbonate then with water and finally with sodium chloride solution. The solvent is evaporated and the residue is fractionated to yield the desired ketone in about 60 percent yield.

EXAMPLE 10

*Preparation of* $C_6H_5CO(CFClCF_2)_3COC_6H_5ClC(CFClCF_2)_3CCl$ (0.5 mole) is added gradually to a cooled, stirred mixture of 1.1 moles of anhydrous $AlCl_3$ and 5.0 moles of dry benzene. The mixture is stirred for 6 hours while it gradually warms to room temperature. The dark reaction mixture is poured into 1 liter of dilute HCl and the organic phase is washed several times with 3 percent HCl. The organic layer is separated and most of the benzene is evaporated. The residual solution is taken up in 0.5 liter of ethyl ether and washed with saturated $NaHCO_3$ and then with water until the washes are neutral. The organic layer is dried, and distilled under reduced pressure to give about a 50 percent yield of $$C_6H_5C(CF_2CFCl)_3-CC_6H_5$$
$$\parallel \quad\quad\quad\quad\quad\quad\quad \parallel$$
$$O \quad\quad\quad\quad\quad\quad\quad O$$

(1,6-dibenzoyl-2,4,6-trichlorononafluorohexane)

EXAMPLE 11

To an autoclave is charged 0.2 mole of 4,6,7-trichloroundecafluoroheptene-1, 0.2 mole of furfural and 0.5 gram of benzoyl peroxide. The autoclave is shaken for 24 hours at 60° C. Fractionation of the reaction mixture produces about a 35 percent yield of the desired ketone,

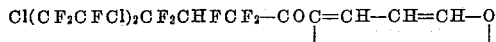

(2'-furoyl-2-hydro-4,6,7-trichloroundecafluoroheptane)

EXAMPLE 12

*Preparation of cyclohexyl - 2,4,6,7 - tetrachloroundecafluoroheptyl ketone*

A Grignard reagent is prepared from 0.2 mole of Mg turnings in 500 ml. of anhydrous ethyl ether and 0.2 mole of bromocyclohexane, and is added to a flask equipped with a stirrer, a reflux condenser and a dropping funnel. 3,5,7,8-tetrachloroundecafluorooctanonitrile (0.2 mole) is added, over a period of 2 hours, to the chilled Grignard solution and stirred for 3 hours at room temperature. Hydrolysis is effected by the dropwise addition of 300 ml. of 20 percent aqueous $H_2SO_4$. The ether layer is separated, dried, and distilled and the residual liquid is redistilled. The product, cyclohexyl-2,4,6,7-tetrachloroundecafluoroheptyl ketone is obtained in about a 55 percent yield.

EXAMPLE 13

*Preparation of* $Cl(CF_2CFCl)_3CF_2C-CH_2-CH=CH_2$
$\quad\quad\quad\quad\quad\quad\quad\quad\quad\quad\quad\quad\parallel$
$\quad\quad\quad\quad\quad\quad\quad\quad\quad\quad\quad\quad O$ A Grignard reagent is prepared from 0.2 mole of Mg turnings in 0.5 liter of anhydrous ethyl ether and 0.2 mole of allyl chloride and is added to a flask equipped with a stirrer, a reflux condenser and a dropping funnel. 3,5,7,8-tetrachloroundecafluorooctanonitrile (0.2 mole) is added, over a 2 hour period, to the chilled Grignard solution and is stirred for 3 hours at room temperature. Hydrolysis is effected by the dropwise addition of 300 ml. of 20 percent aqueous $H_2SO_4$. The ether layer is separated, dried and evaporated and the residual liquid is fractionated to give allyl-2,4,6,7-tetrachloroundecafluoroheptyl ketone in about 55 percent yield.

EXAMPLE 14

*Preparation of* 

A Grignard reagent is prepared from 0.2 mole of Mg turnings in 500 ml. of anhydrous ethyl ether and 0.2 mole of 3-chlorocyclopentene and is added to a flask equipped with a stirrer, a reflux condenser and a dropping funnel. 3,5,7,8-tetrachloroundecafluorooctanonitrile (0.2 mole) is added, over a period of 2 hours, to the chilled Grignard solution and is stirred for 3 hours at room temperature. Hydrolysis is effected by the dropwise addition of 300 ml. of 20 percent aqueous $H_2SO_4$. The ether layer is separated, dried, and evaporated and the residual liquid is fractionated. The product, cyclopenten - 2' - yl - 2,4,6,7 - tetrachloroundecafluoroheptyl ketone, is obtained in about a 55 percent yield.

It will be obvious to those skilled in the art that many modifications may be made within the scope of the present invention without departing from the spirit thereof, and the invention includes all such modifications.

We claim:

1. A ketone derivative of a perchlorofluorocarboxylic acid having not more than two carboxyl groups, said ketone having at least one chlorine atom and a

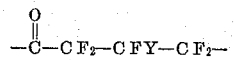

group wherein Y is selected from the group consisting of hydrogen and chlorine.

2. A ketone derivative of a perchlorofluoromonocarboxylic acid, said ketone having at least one chlorine atom and a $$-\overset{O}{\underset{\|}{C}}-CF_2-CFY-CF_2-$$

group wherein Y is selected from the group consisting of hydrogen and chlorine.

3. A ketone derivative of a perchlorofluorodicarboxylic acid, said ketone having at least one chlorine atom and a $$-\overset{O}{\underset{\|}{C}}-CF_2-CFY-CF_2-$$

group wherein Y is selected from the group consisting of hydrogen and chlorine.

4. A ketone having the formula $$Z(CF_2-CFCl)_{n-1}CF_2\overset{O}{\underset{\|}{C}}-R$$

in which Z is selected from the group consisting of chlorine and perhalomethyl radicals having a total atomic weight not in excess of 146.5, $n$ is an integer from 2 to 10, and R is selected from the group consisting of substituted and unsubstituted alkyl, aryl, alkenyl, cycloalkyl, cycloalkenyl, and heterocyclic radicals having not in excess of about 20 carbon atoms.

5. A ketone having the formula $$Cl(CF_2-CFCl)_{n-1}CF_2\overset{O}{\underset{\|}{C}}-R$$

in which $n$ is an integer from 2 to 10, and R is selected from the group consisting of substituted and unsubstituted alkyl, aryl, alkenyl, cycloalkyl, cycloalkenyl and heterocyclic radicals having not in excess of about 20 carbon atoms.

6. A ketone having the formula $$Cl(CF_2-CFCl)_{n-1}CF_2\overset{O}{\underset{\|}{C}}-R$$

in which $n$ is an integer from 2 to 10 and R is an alkyl radical having not in excess of about 20 carbon atoms.

7. A ketone having the formula $$Cl(CF_2-CFCl)_{n-1}CF_2\overset{O}{\underset{\|}{C}}-R$$

in which $n$ is an integer from 2 to 10 and R is an aryl radical having not in excess of about 20 carbon atoms.

8. A diketone having the formula $$R-\overset{O}{\underset{\|}{C}}-CFCl(CF_2-CFCl)_{n-2}CF_2\overset{O}{\underset{\|}{C}}-R$$

in which $n$ is an integer from 2 to 8, and R is selected from the group consisting of substituted and unsubstituted alkyl, aryl, alkenyl, cycloalkyl, cycloalkenyl and heterocyclic radicals having not in excess of about 20 carbon atoms.

9. A diketone having the formula $$R-\overset{O}{\underset{\|}{C}}-CFCl(CF_2-CFCl)_{n-2}CF_2\overset{O}{\underset{\|}{C}}-R$$

in which $n$ is an integer from 2 to 8, and R is an alkyl radical having not in excess of about 20 carbon atoms.

10. A diketone having the formula $$R-\overset{O}{\underset{\|}{C}}-CFCl(CF_2-CFCl)_{n-2}CF_2\overset{O}{\underset{\|}{C}}-R$$

in which $n$ is an integer from 2 to 8, and R is an aryl radical having not in excess of about 20 carbon atoms.

11. A ketone having the formula $$Z(CF_2-CFCl)_{n-1}CF_2CHFCF_2\overset{O}{\underset{\|}{C}}-R$$

in which Z is selected from the group consisting of chlorine and perhalomethyl radicals having a total atomic weight not in excess of 146.5, $n$ is an integer from 1 to 9, and R is selected from the group consisting of substituted and unsubstituted alkyl, aryl, alkenyl, cycloalkyl, cycloalkenyl, and heterocyclic radicals having not in excess of about 20 carbon atoms.

12. A ketone having the formula $$Cl(CF_2-CFCl)_{n-1}CF_2CHFCF_2\overset{O}{\underset{\|}{C}}-R$$

in which $n$ is an integer from 1 to 9, and R is selected from the group consisting of substituted and unsubstituted alkyl, aryl, alkenyl, cycloalkyl, cycloalkenyl, and heterocyclic radicals having not in excess of about 20 carbon atoms.

13. The ketone having the formula $$Cl(CF_2CFCl)_3CF_2C(O)C_4H_9$$

14. The ketone having the formula $$Cl(CF_2CFCl)_3CF_2C(O)C_6H_5$$

References Cited in the file of this patent

UNITED STATES PATENTS

| | | |
|---|---|---|
| 2,415,796 | Lichty | Feb. 11, 1947 |
| 2,449,877 | Carswell et al. | Sept. 21, 1948 |
| 2,588,123 | Kern | Mar. 4, 1952 |
| 2,712,554 | Miller | July 5, 1955 |

OTHER REFERENCES

Schlesinger, abandoned application Ser. No. 662,600, published March 6, 1951.

Bunnett et al.: J. Am. Chem. Soc. 67, pages 1944–1946 (1945).

Jones: J. Am. Chem. Soc. 70, pages 143–4 (1948).

La Zerte et al.: J. Am. Chem. Soc. 77, pages 910–913 (1955).

UNITED STATES PATENT OFFICE
CERTIFICATE OF CORRECTION

Patent No. 2,824,139                                                                February 18, 1958

William S. Barnhart et al.

It is hereby certified that error appears in the printed specification of the above numbered patent requiring correction and that the said Letters Patent should read as corrected below.

Column 7, lines 53 and 54, Example 10, for "$C_6H_5CO(CFClCF_2)_3COC_6H_5Cl\underset{\underset{O}{\|}}{C}(CFClCF_2)\underset{\underset{O}{\|}}{C}Cl$" read --$C_6H_5CO(CFClCF_2)_3COC_6H_5Cl\underset{\underset{O}{\|}}{C}(CFClCF_2)_3\underset{\underset{O}{\|}}{C}Cl$ --.

Signed and sealed this 29th day of July 1958.

(SEAL)
Attest:
KARL H. AXLINE                                                          ROBERT C. WATSON Attesting Officer                                                      Commissioner of Patents